(12) United States Patent
Urata et al.

(10) Patent No.: US 11,813,885 B2
(45) Date of Patent: Nov. 14, 2023

(54) LAMINATED BODY

(71) Applicant: Dai Nippon Printing Co., Ltd., Tokyo (JP)

(72) Inventors: Shuhei Urata, Tokyo (JP); Takumi Motoi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 99 days.

(21) Appl. No.: 17/194,535

(22) Filed: Mar. 8, 2021

(65) Prior Publication Data

US 2021/0187993 A1 Jun. 24, 2021

Related U.S. Application Data

(63) Continuation of application No. 15/745,561, filed as application No. PCT/JP2016/071358 on Jul. 21, 2016, now Pat. No. 10,974,538.

(30) Foreign Application Priority Data

Jul. 21, 2015 (JP) ................................ 2015-144286

(51) Int. Cl.
*B42D 25/45* (2014.01)
*B41M 5/26* (2006.01)
(Continued)

(52) U.S. Cl.
CPC .............. *B42D 25/45* (2014.10); *B32B 27/00* (2013.01); *B41M 5/26* (2013.01); *B42D 25/23* (2014.10);
(Continued)

(58) Field of Classification Search
CPC ...... B42D 25/45; B42D 25/455; B42D 25/46; B42D 25/41; B42D 25/23; B42D 25/328; B41M 5/26
(Continued)

(56) References Cited

U.S. PATENT DOCUMENTS 5,528,280 A 6/1996 Endo et al.
2009/0251749 A1 10/2009 O'Boyle et al.
(Continued)

FOREIGN PATENT DOCUMENTS

EP 2399740 A1 12/2011
EP 2487029 A1 8/2012
(Continued)

OTHER PUBLICATIONS

International Search Report dated Sep. 20, 2016, issued for PCT/JP2016/071358.
(Continued)

*Primary Examiner* — Justin V Lewis
(74) *Attorney, Agent, or Firm* — Locke Lord LLP (57) ABSTRACT

Provided is a laminated body in which a print layer is provided downstream of a laser color development layer without lowering quality. A card is provided with an offset print layer laminated on a base material, a buffer layer laminated on the offset print layer and having translucency, and a laser color development layer laminated on the buffer layer. The buffer layer minimizes scratches on the offset print layer that occur with the heat generation of the laser color development layer.

17 Claims, 8 Drawing Sheets

(51) Int. Cl.
*B42D 25/23* (2014.01)
*B42D 25/328* (2014.01)
*B42D 25/41* (2014.01)
*B42D 25/455* (2014.01)
*B42D 25/46* (2014.01)
*B32B 27/00* (2006.01)

(52) U.S. Cl.
CPC .......... *B42D 25/328* (2014.10); *B42D 25/41* (2014.10); *B42D 25/455* (2014.10); *B42D 25/46* (2014.10)

(58) Field of Classification Search
USPC .............. 283/67, 72, 74, 84, 86, 94, 98, 901
See application file for complete search history.

(56) References Cited

U.S. PATENT DOCUMENTS

| | | | |
|---|---|---|---|
| 2012/0164419 | A1 | 6/2012 | Sakagami et al. |
| 2012/0187672 | A1 | 7/2012 | Sakagami et al. |
| 2012/0301639 | A1 | 11/2012 | Grigorenko et al. |
| 2014/0247499 | A1 | 9/2014 | Doublet et al. |
| 2015/0251481 | A1* | 9/2015 | Callant .................. B42D 25/30 428/199 |

FOREIGN PATENT DOCUMENTS

| | | |
|---|---|---|
| EP | 2750897 B1 | 1/2016 |
| EP | 3075559 A1 | 10/2016 |
| EP | 2487029 B1 | 7/2019 |
| EP | 2399740 B1 | 4/2020 |
| JP | 2006-103221 A | 4/2006 |
| JP | 2011-213065 A | 10/2011 |
| JP | 2013-240885 A | 12/2013 |
| WO | 2010/095747 A1 | 8/2010 |
| WO | 2011/043087 A1 | 4/2011 |
| WO | WO-2014057039 A1 * 4/2014 ............. B42D 25/30 |
| WO | 2014/126025 A1 | 8/2014 |
| WO | 2015/079541 A1 | 6/2015 |

OTHER PUBLICATIONS

Extended European Search Report dated Jan. 18, 2019, issued in the EP Patent Application No. EP16827818.2.
Office Action dated Oct. 27, 2021, issued in the EP Patent Application No. 20200214.3.

* cited by examiner

FIG. 1A

FIG. 2A
TRIAL PRODUCT ACCORDING TO FIRST EMBODIMENT 1A

FIG. 2C
ENLARGEMENT OF PORTION INDICATED BY ARROW C

FIG. 3A
TRIAL PRODUCT ACCORDING TO FIRST EMBODIMENT 1C

PATTERN 23 (OFFSET PRINT LAYER 20)

PRINT INFORMATION 43 (LASER COLOR DEVELOPMENT LAYER 40)

FIG. 3B
COMPARATIVE PRODUCT 101C

PATTERN 123 (OFFSET PRINT LAYER)

PRINT INFORMATION 143 (LASER COLOR DEVELOPMENT LAYER)

LAMINATED BODY

This Application is a Continuation of U.S. application Ser. No. 15/745,561 filed on Jan. 17, 2018, which is a National Stage Entry of PCT Application No. PCT/JP2016/071358 filed on Jul. 21, 2016, which claims priority from Japanese Application No. 2015-144286 filed on Jul. 21, 2015. The entire contents of these applications are incorporated herein by reference in their entirety.

TECHNICAL FIELD

The present invention relates to a laminated body having a laser color development layer.

BACKGROUND ART

Conventionally, there was a card in which a laser color development layer was laminated above a support (base material) (for example, Patent Document 1).

However, if a print layer by offset printing or the like is provided below the laser color development layer in the case of the conventional card, the print layer is damaged due to heat generated in the laser color development layer as a result of laser beam irradiation. For this reason, in the conventional card, the damaged print layer was observed as blurred around the print information of the laser color development layer, and the quality deteriorated, accordingly.
Patent Document 1: Japanese Unexamined Patent Application, Publication No. 2006-103221

DISCLOSURE OF THE INVENTION

Problems to be Solved by the Invention

An object of the present invention is to provide a laminated body in which a print layer is provided below a laser color development layer without lowering quality.

Means for Solving the Problems

The present invention solves the above-described problem by the following solving means. In order to facilitate understanding, reference symbols corresponding to the embodiments of the present invention are attached, but the present invention is not limited thereto. In addition, components described with the reference symbols may be modified as appropriate, and at least a portion thereof may be replaced by another component.

In a first aspect of the invention is a laminated body including a base material (10), a print layer (20) laminated above the base material, a barrier layer (30) laminated above the print layer and having translucency, and a laser color development layer (40) laminated above the barrier layer and having translucency, in which the barrier layer suppresses damage to the print layer due to heat generated in the laser color development layer by laser irradiation.

In a second aspect of the invention is the laminated body according to the first aspect, in which a thickness t (mm) of the barrier layer (30) is $0.01 \le t \le 0.05$.

In a third aspect of the invention is the laminated body according to the first aspect, in which a thickness t (mm) of the barrier layer (30) is $0.01 \le t \le 0.02$.

In a fourth aspect of the invention is the laminated body according to any one of the first to third aspects, further including a protective layer (50) provided above the laser color development layer (40), having translucency, and protecting the laser color development layer.

In a fifth aspect of the invention is the laminated body according to any one of the first to fourth aspects, in which the barrier layer (30) has optical diffraction structure.

In a sixth aspect of the invention is the laminated body according to any one of the first to fifth aspects, in which the laminated body (1, 201) is a card.

Effects of the Invention

According to the present invention, it is possible to provide a laminated body in which a print layer is provided below a laser color development layer without lowering quality.

PREFERRED MODE FOR CARRYING OUT THE INVENTION

Embodiments

Hereinafter, embodiments of the present invention will be described with reference to the drawings and the like.

First Embodiment

Figure 1A:
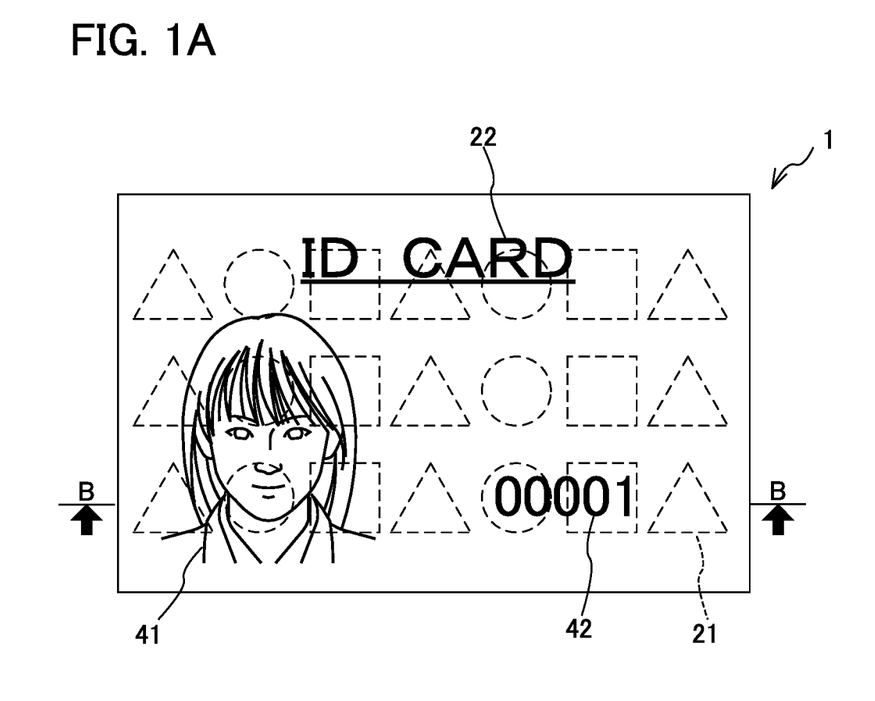
FIGS. 1A and 1B are views illustrating a card 1 according to a first embodiment.
Figure 1B:
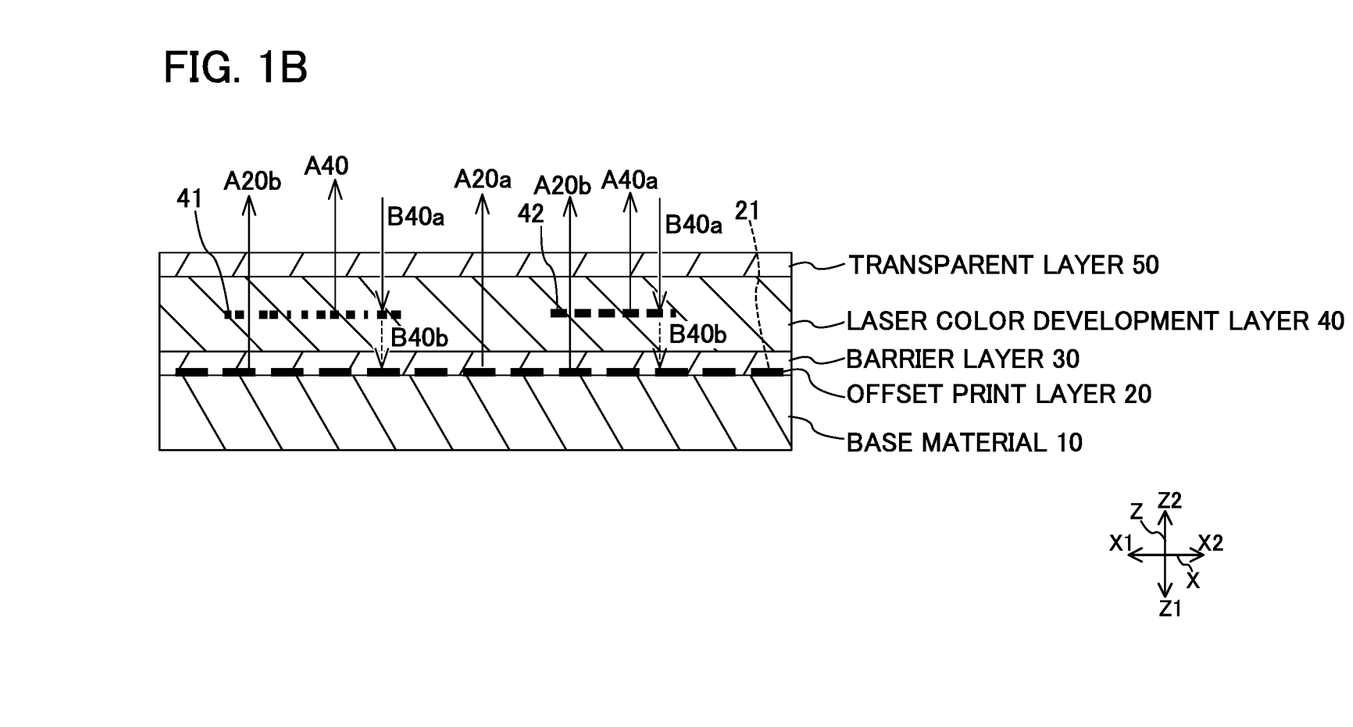

FIG. 1 is a view illustrating a card 1 according to a first embodiment.

FIG. 1A is a view of the card 1 as viewed from upward.

FIG. 1B is a cross-sectional view of the card 1 (a cross-sectional view taken along line B-B in FIG. 1A).

In the embodiments and the drawings, for facilitating description and understanding, the description will be made based on an XYZ orthogonal coordinate system.

The coordinate system represents a left-right direction X (left side X1 and right side X2), a longitudinal direction Y (lower side Y1 and upper side Y2), a thickness direction Z (lower side Z1 and upper side Z2) with reference to the state of FIG. 1A.

In the drawings, the configuration in the thickness direction Z is illustrated in an exaggerated manner as appropriate.

[Configuration of Card 1]

In the embodiment, an example where the card 1 (laminated body) is an identification card (ID card) of an employee issued by a company will be described.

The card 1 includes an offset print layer 20, a barrier layer 30, a laser color development layer 40, and a transparent layer 50 which are laminated in this order on a base material 10 from the lower side Z1 to the upper side Z2.

The base material 10, the barrier layer 30, the laser color development layer 40, and the transparent layer 50 are formed with a resin sheet such as PC, PET, PET-G, or PVC or a sheet material of an alloy of these resins. Thermal welding or the like performed by heat pressing is applied for bonding these layers to each other.

In the embodiment, an example in which layers are provided only on the upper side Z2 of the base material 10 is described, but other layers may be provided on the lower side Z1 of the base material 10 as needed.

The base material 10 is a member that serves as a base of the card 1. The base material 10 is a layer that does not transmit light. The color of the base material 10 is, for example, white or the like.

The offset print layer 20 is laminated on the base material 10 by directly performing offset printing. The printing method is not limited to offset printing, but other alternative printing methods (silk printing and the like) may be used.

The print content of the offset print layer 20 is print information 21 in which a plurality of combinations of symbols "ΔO☐" are arranged and print information 22 of characters "ID CARD." In FIG. 1A, for convenience sake, the print information 21 is indicated by a broken line.

The print content of the offset print layer 20 is not limited thereto, but, may be a figure, a pattern, or the like, for example. In addition, the offset print layer 20 may be a monochromatic print with black or the like or may be a color print with a plurality of colors.

The barrier layer 30 has translucency and is colorless and transparent. As described later, the barrier layer 30 suppresses the damage to the offset print layer 20 due to heat generated in the laser color development layer 40.

In addition, the barrier layer 30 is not limited to being configured to be laminated on an entire surface of the card 1. For example, the barrier layer 30 may be laminated only on the laser color development layer 40 or only on a portion where the print information appears by laser color development. In addition, although the barrier layer 30 is easy to manufacture in a form of one layer, the barrier layer 30 is not limited thereto. The barrier layer 30 may have a form in which two or more layers of the same material or different materials are laminated.

The laser color development layer 40 has translucency and is colorless and transparent. The laser color development layer 40 includes a color developer. Accordingly, the area irradiated with a laser beam in the laser color development layer 40 generates heat and develops a black color. In the embodiment, such color development is also referred to as "laser printing," "laser character printing," or the like.

For convenience sake, it is illustrated in the drawings that the laser color development layer 40 develops the color only partially in the thickness direction Z.

However, in general, the color is developed over an entirety of the laser color development layer 40 in the thickness direction Z.

In addition, the material of the laser color development layer 40 may not include a color developer as long as the material develops color by irradiation with a laser beam. The developed color may be other than black.

The print content of the laser color development layer 40 includes a photographic image 41 of an employee and an identification number 42 which is text information. As the upper surface of the card is viewed from upward, the photographic image 41 and the identification number 42 overlap with the print information 21 of the offset print layer 20. In addition, the barrier layer 30 and the laser color development layer 40 are not limited to being colorless and transparent. The colors of the barrier layer 30 and the laser color development layer 40 may be any colors as long as the print information of the laser color development layer 40 and the offset print layer 20 is visible.

The transparent layer 50 is a layer having translucency like the barrier layer 30. The transparent layer 50 is a protective layer for protecting the laser color development layer 40. In a case where the laser color development layer 40 has a sufficient strength or the like, the transparent layer 50 may be omitted.

[Observation Mode]

The upper surface of the card is observed as described below.

The print information 21 and 22 of the offset print layer 20 are observed through the laser color development layer 40 and the transparent layer 50 (refer to an arrow A20a).

In addition, in the area where the print information 21 of the offset print layer 20 overlaps with the photographic image 41 and the identification number 42 of the laser color development layer 40, the print information 21 of the offset print layer 20 can be observed at the gaps of the color development portion of the laser color development layer 40 through the laser color development layer 40 and the transparent layer 50 (refer to an arrow A20b).

The photographic image 41 and the identification number 42, which are the print information of the laser color development layer 40, are observed through the transparent layer 50 (refer to an arrow A40).

[Manufacturing Method]

The card 1 is manufactured according to the following processes.

(Offset Print Layer Forming Process)

By performing offset printing on the base material 10, the offset print layer 20 is formed.

(Lamination Process)

The barrier layer 30, the laser color development layer 40 in a state before laser printing, and the transparent layer 50 are laminated in this order from the lower side Z1 on the base material 10 having been subjected to offset printing, and the layers in lamination are bonded to each other by heat pressing or the like.

In this case, instead of bonding the entire layers simultaneously, a laminated sheet in which some of the layers have been laminated may be manufactured in advance. For example, the laminated sheet in which the barrier layer 30, the laser color development layer 40, and the transparent layer 50 are bonded to each other may be manufactured in advance, and this laminated sheet and the base material 10 may be bonded by heat pressing or the like. Such a laminated sheet may be commercially purchased.

In addition, the card 1 may be manufactured by a multiple cards method. In other words, in card manufacturing, individual cards may be manufactured by a punching process and the like after a laminated body in which a plurality of cards 1 are arranged is manufactured.

(Laser Print Process)

Using a laser irradiation apparatus, the upper surface of the card is irradiated with a laser beam. After transmitting through the transparent layer 50 which is a transparent layer, the laser beam reaches the laser color development layer 40 and develops a color in the laser color development layer 40 (refer to an arrow B40a).

This laser printing process may be performed by a card manufacturer or by a company to which the card is to be delivered in a case where the company owns a laser irradiation apparatus.

Through the above-described processes, the card 1 can be manufactured.

Herein, in the laser printing process, the laser color development layer 40 generates heat by laser irradiation.

The heat generated in the laser color development layer 40 transfers to the barrier layer 30 and then to the offset print layer 20 (refer to an arrow B40b). Accordingly, the barrier layer 30 functions as a thermal insulator, and the heat generated in the laser color development layer 40 does not directly transfer to the offset print layer 20. Accordingly, the barrier layer 30 exhibits a function and an effect which enable the suppression of the damage to the offset print information caused by the heat generation.

[Verification Test]

A trial product according to the first embodiment and a comparative product were manufactured, and a verification test was performed to verify the above-described function and effect in detail.

The configuration of the trial product according to the first embodiment, the configuration of the comparative product, and the laser irradiation apparatus will be described below.

It should be noted that the configuration described below is an example.

A trial product according to the first embodiment (refer to FIG. 1)

A transparent layer 50: a polycarbonate (PC) resin, 10 μm

A laser color development layer 40: a PC resin or an alloy resin of a PC resin, 50 μm A barrier layer 30 (similar to the transparent layer 50): a PC resin, 10 μm A base material 10: a PC resin or an alloy resin of a PC resin, 100 μm In an offset print layer 20, a pattern 23 of light color was provided over an entire upper surface of the base material 10. However, the pattern 23 is not a type of solid printing.

Accordingly, the upper surface of the base material 10 is visible in the area where the pattern 23 is not provided.

Comparative Product

A comparative product has a configuration obtained by removing the barrier layer 30 from the trial product.

A transparent layer: a PC resin with a thickness of 10 μm

A laser color development layer: a PC resin or an alloy resin of a PC resin, 50 μm A base material: a PC resin or an alloy resin of a PC resin, 100 μm An offset print layer 20 is similar to that of the trial product.

A laser irradiation apparatus: Laser Marker CLM-20 produced by NIDEC COPAL CORPORATION.

[Verification Test 1]

In a verification test 1, it was verified whether or not there was damage to the offset print layer 20 caused by the intensity of a laser beam.

Figure 2A:
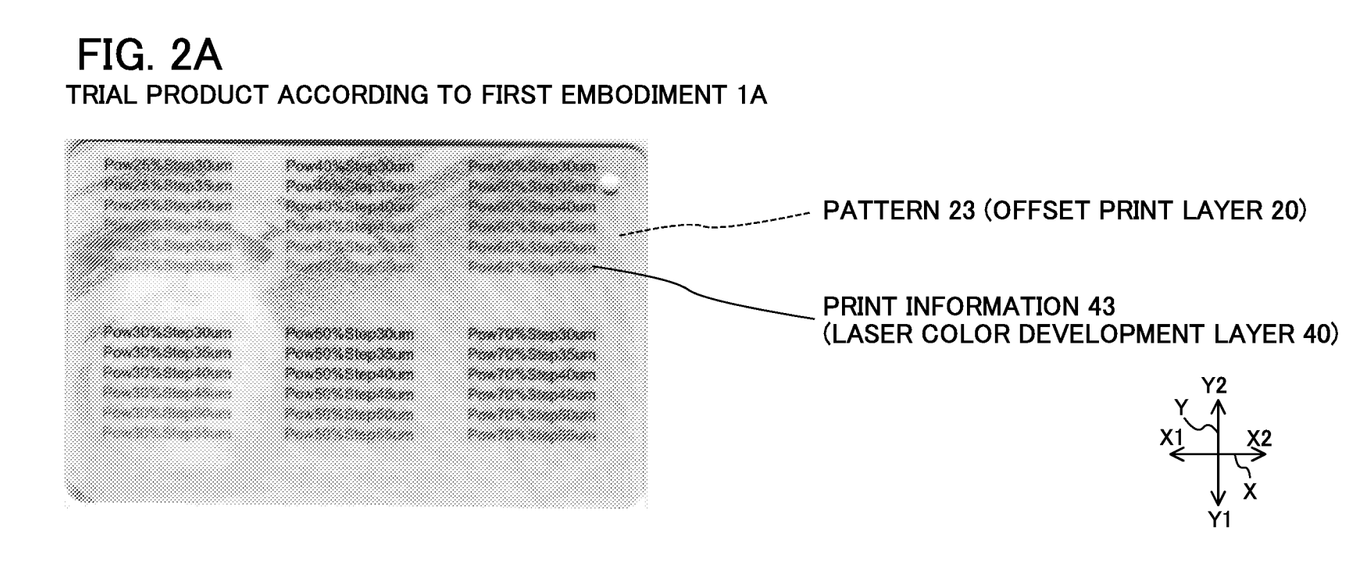
FIGS. 2A to 2C are photographic images illustrating results of a verification test 1 of trial products 1A and 1B according to the first embodiment.
Figure 2B:
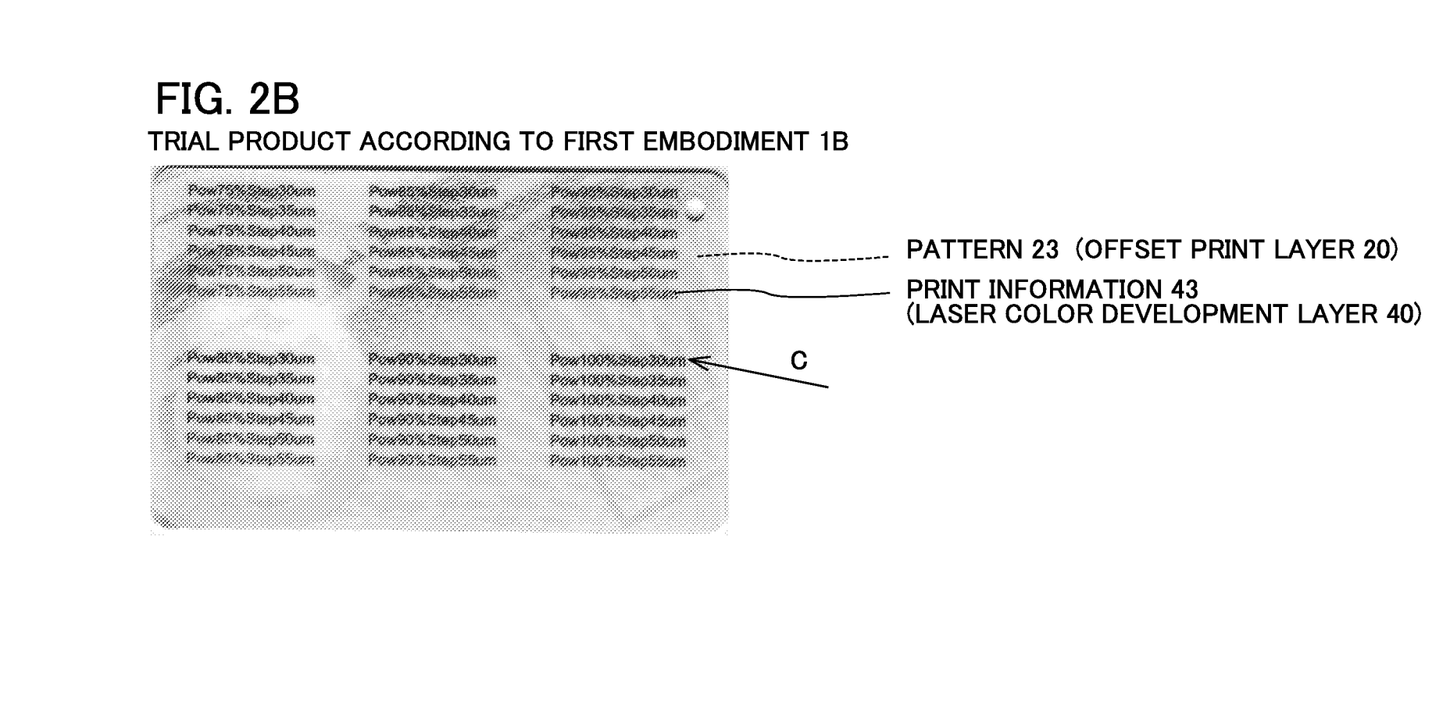

FIGS. 2A and 2B are photographic images illustrating results of trial products 1A and 1B of the verification test 1 according to the first embodiment.

(Intensity of Laser Beam)

With respect to the intensity of the laser beam, the intensity of the laser beam itself and the dot interval (that is, dot density) were changed as described below.

The intensity of the laser beam itself: The irradiation intensity (Pow) of the laser irradiation apparatus was changed by 5% from 25 to 100%.

The dot interval (Step): The dot interval was changed in steps of 5 μm from 30 to 55 μm.

Print information 43 and 143 of laser printing are character information indicating the condition of the intensity of the laser beam, respectively.

Result of Verification Test 1

Trial Products 1A and 1B According to the First Embodiment

As illustrated in FIGS. 2A and 2B, with respect to the trial products 1A and 1B, the entire print information 43 was clearly (sharply) observable.

Figure 2C:
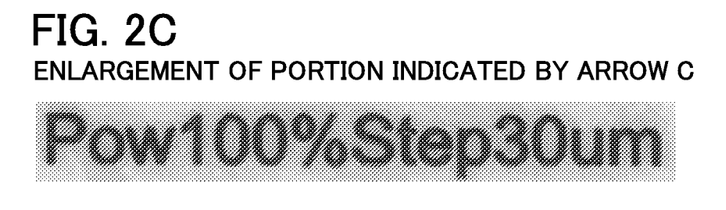

In addition, with respect to the trial products 1A and 1B, it was observable that the color darkened gradually from gray to black depending on the intensity of the laser beam. Furthermore, as illustrated in FIG. 2C, there was no damage to the offset print layer 20 even with respect to the character printing "Pow 100% Step 30 μm" having the largest heat generation. Accordingly, the print information 43 of the offset print layer 20 was clearly observable.

As a result, with respect to the trial products 1A and 1B, it was verified that there was no damage to the offset print layer 20 at each of the applied intensities of the laser beam.

Although detailed description is omitted, a comparative product (not illustrated) in which the offset print layer 20 was omitted from the trial products 1A and 1B according to the first embodiment, that is, a comparative product in which the base material 10 was plain was also manufactured.

When the print information of laser printing of the comparative product and the print information of laser printing of the trial products 1A and 1B according to the first embodiment were visually observed with eyes, no difference in quality was verified between the two products. In other words, in the trial products 1A and 1B according to the first embodiment, there was no deterioration in quality due to attaching the offset print layer 20.

In addition, in other trial products (not illustrated) according to the first embodiment, fine characters, figures, and the like such as microtaggants which are hard to visually distinguish with eyes were laser-printed. When such fine characters and the like were observed with a magnifying glass, there was no crush, that is, the characters and the like were clear. In addition, by the trial product, it was verified that printed characters with a character size of 0.135 μm were distinguishable.

[Verification Test 2]

Figure 3A:
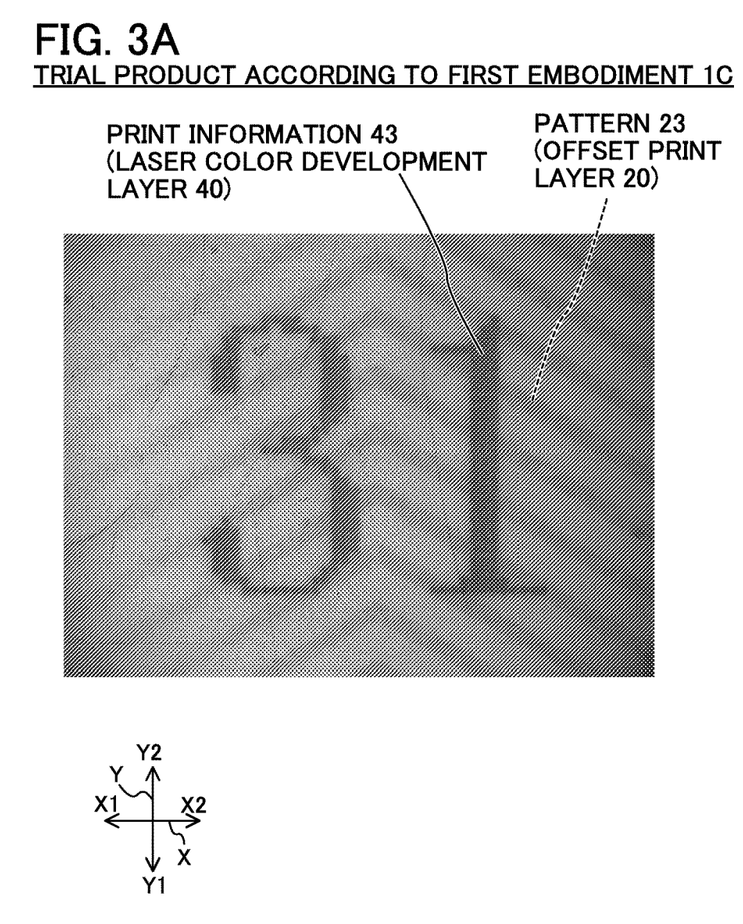
FIGS. 3A and 3B are photographic images illustrating comparison between a trial product 1C according to the first embodiment and a comparative product 101C.
Figure 3B:
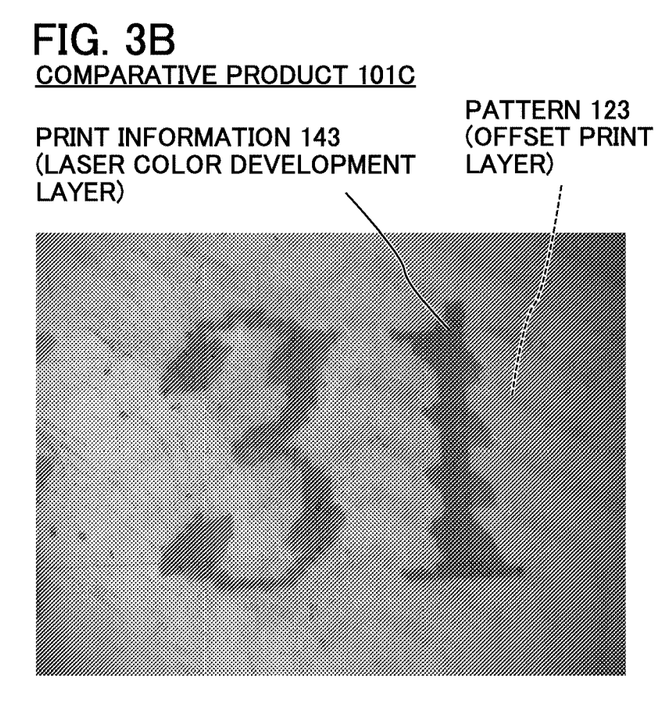

FIGS. 3A and 3B are photographic images to show a comparison.

FIG. 3A is a photographic image of a trial product 1C according to the first embodiment, and FIG. 3B is a photographic image of a comparative product 101C.

In the verification test 2, characters "31" are printed by laser character printing on the trial product 1C according to the first embodiment and the comparative product 101C, as print information 43 and 143, respectively. The character size is 7 pt. The print conditions for the two products are the same.

As illustrated in FIG. 3A, the trial product 1C according to the first embodiment had almost no damage to a portion of the pattern 23 (ink) of the offset print layer 20, and the outline of the print information 43 (that is, the outline of a character "31") was sharp.

On the other hand, as illustrated in FIG. 3B, in the comparative product 101C, damage (burning) occurred to the pattern 123 (ink) of the offset print layer. This is because the heat generated in the laser color development layer transferred directly to the offset print layer.

The damage to the offset print layer in the comparative product 101C occurred within and around the area of the print information 143 of the laser color development layer. Accordingly, the characters of comparative product 101C were observed as blurred. For this reason, the quality of laser character printing of the comparative product 101C was significantly inferior to that of the trial product 1C according to the first embodiment.

[Verification Test 3]

In a verification test 3, damage to the offset print layer 20 was verified by performing laser printing of a black-and-white photograph of a person's face. In other words, the fineness of the laser-printed photograph was verified.

The area of laser printing and the size of the image of a person are as illustrated in FIG. 1. The intensity of the laser beam was adjusted by allowing the intensity of the laser beam itself to be constant and adjusting only the dot interval (dot density).

(Result of Verification Test 3)

Although the photographic image of the verification test 3 is omitted, in the trial product according to the first embodiment, no damage occurred to the offset print layer. For this reason, it was successful that shades of gray of an intermediate color were clearly expressed. Accordingly, it was successful that the shades of the color of the skin of a person were clearly reproduced.

In addition, similarly to the above-described verification tests 1 and 2, the hair was printed without blurring and in dark black color, so that thin black lines were expressed successfully.

On the other hand, in the comparative product, damage occurred to the hair and the offset print layer surrounding the hair like the verification test 2. Accordingly, the hair was observed as fuzzed up.

In addition, in the comparative product, there was a problem in that, if the laser irradiation was performed with the intensity of the laser beam lowered to such an extent that the hair was not fuzzed up, the color of the entire laser-printed image became light.

By the above-described verification tests 1 to 3, it was verified that the trial product according to the first embodiment suppressed the damage to the offset print layer caused by the laser irradiation, and it was also verified that even delicate print like a photograph was clearly reproducible. Accordingly, the trial product according to the first embodiment allowed the expression power (gradation and the like) of the print to be larger than that of the comparative product.

In addition, it was verified that the trial product according to the first embodiment caused no damage to the offset print layer 20 even if the intensity of the laser beam was set to be stronger than that of the comparative product. Accordingly, it is possible for the trial product according to the first embodiment to allow the range of the intensity of a laser beam which is a print condition to be set larger than that for the comparative product. It is possible for the trial product according to the first embodiment to expand the range of selection of dot intervals which is a setting condition of a laser irradiation apparatus, for example. Accordingly, the trial product according to the first embodiment can be easily manufactured since the setting of print conditions of the trial product is easier than that of the comparative product.

[Thickness of Barrier Layer 30]

As demonstrated in the above-described verification test, it was verified that, even if a thickness of the barrier layer 30 was 10 μm (0.01 mm), the offset print layer 20 was sufficiently protected from the heat generated in the laser color development layer 40. Herein, the thickness of a typical card (for example, a credit card and the like) is about 0.8 mm. For this reason, even if the thickness of the barrier layer 30 is sufficiently small as compared with the total thickness of the card 1, the offset print layer 20 can be protected from heat generation.

Accordingly, providing the barrier layer 30 neither causes the card to become extremely thick, nor requires other layers to be extremely thin in order to maintain the total thickness. As a result, the card 1 can be used not only for identification cards but also for credit cards and the like including a film substrate having, for example, a coil antenna.

In addition, products including barrier layers having a thickness of 30 μm (0.03 mm) and 50 μm (0.05 mm) besides the thickness of 10 μm of the barrier layer 30 were manufactured as the trial product according to the first embodiment. There was no difference in print quality among these three trial products.

For this reason, it was verified that it is possible to suppress the damage to the offset print layer 20 in the card 1 if the thickness t (mm) of the barrier layer 30 is "$0.01 \le t \le 0.05$."

In addition, if the thickness t (mm) of the barrier layer 30 is "$0.01 \le t \le 0.02$," the card 1 has the effect of providing the offset print layer 20 without allowing the card 1 to be extremely thick as described above.

In addition, in a case where barrier layers 30 each having a thickness less than 10 μm can be laminated between the base material 10 and the laser color development layer 40, the thickness of less than 10 μm may be acceptable.

In addition, the barrier layer 30 may have a thickness of 50 μm or more as long as it is possible to obtain the effect of suppressing the damage to the offset print layer 20 due to the heat generated in the laser color development layer 40.

As described above, in the card 1 according to the first embodiment, even if the offset print layer 20 is provided on the side Z1 lower than the laser color development layer 40, the damage to the offset print layer 20 due to the heat generated in the laser color development layer 40 can be suppressed. Accordingly, the quality of the card 1 is not lowered.

Second Embodiment

Next, a second embodiment of the present invention will be described.

In the following description and the drawings, the components which perform the same functions as those of the above-described first embodiment are appropriately denoted by the same reference symbols or the same reference symbols of the last portions (lower two digits), and redundant description will be appropriately omitted.

Figure 4A:
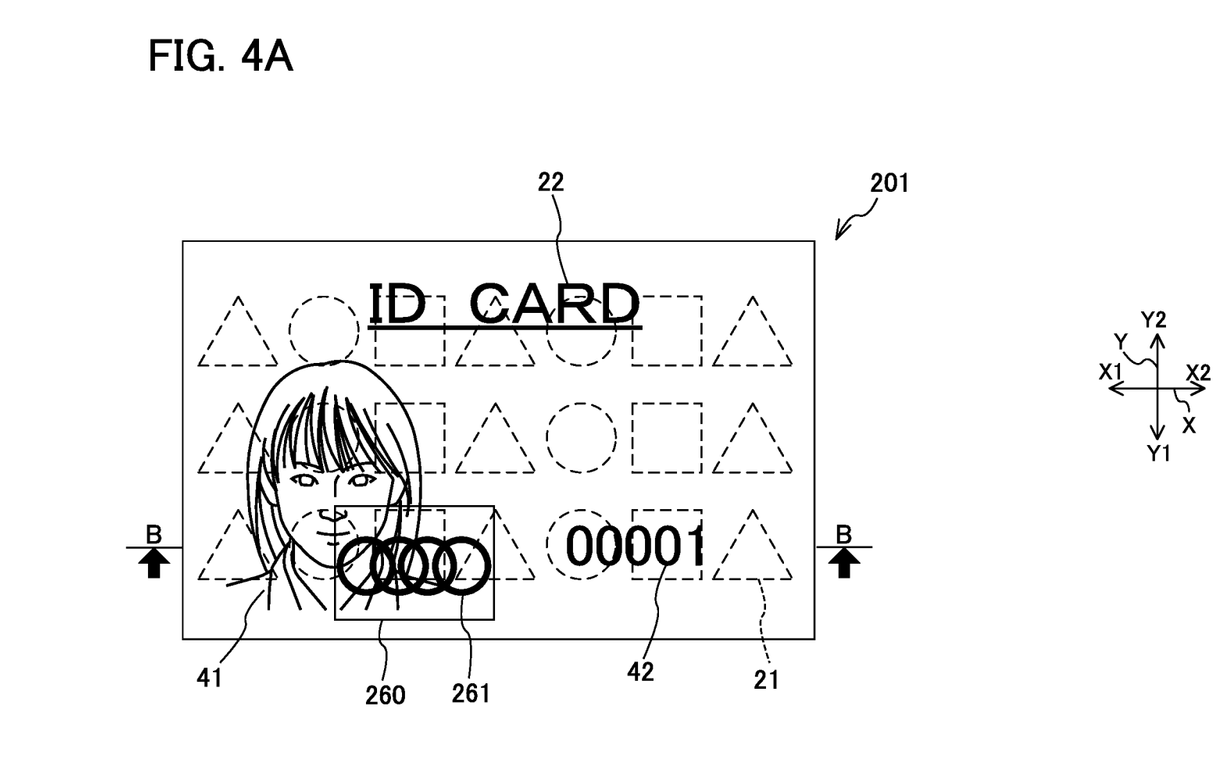
FIGS. 4A and 4B are views illustrating a card 201 according to a second embodiment.
Figure 4B:
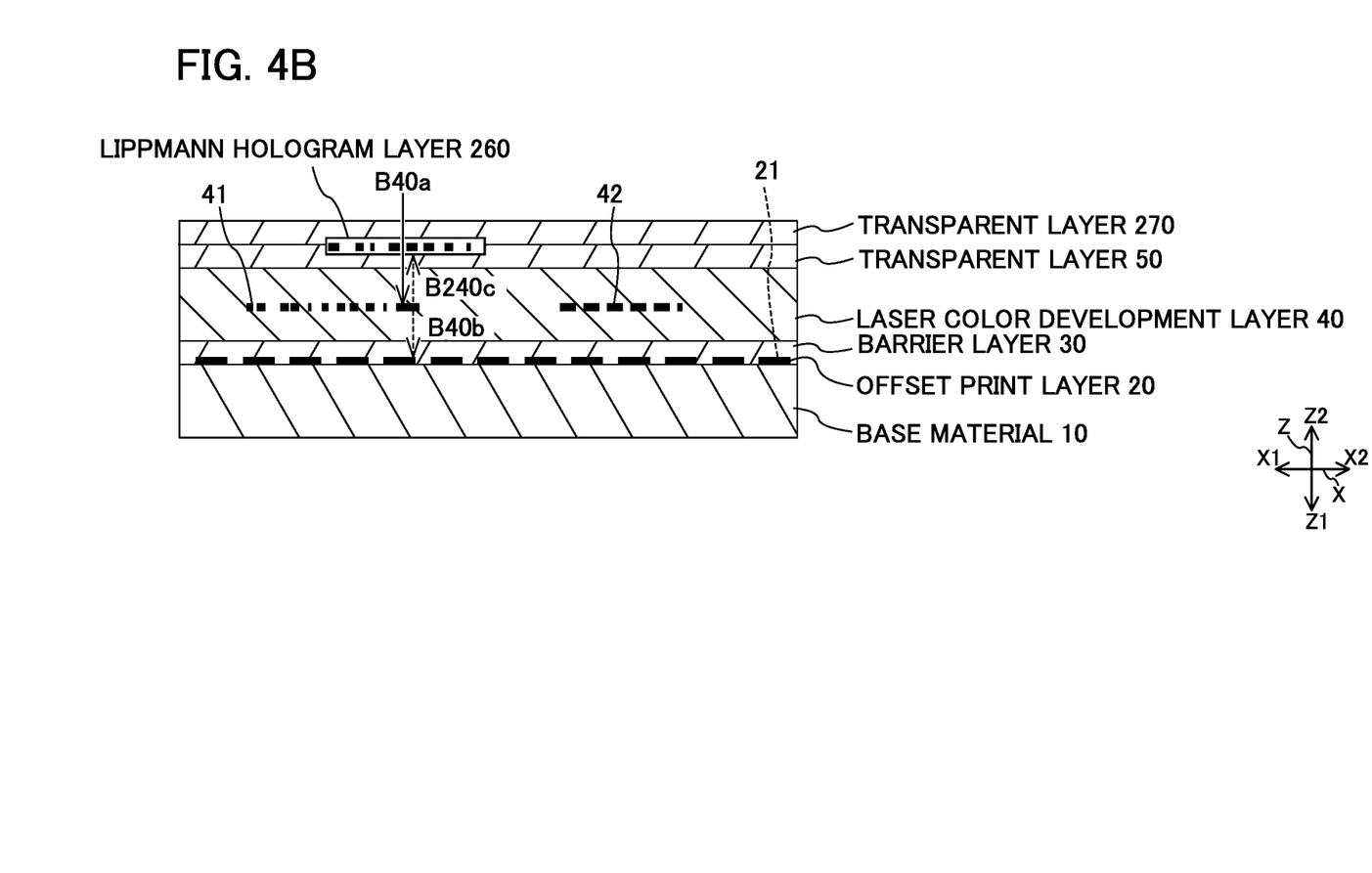

FIG. 4 is a view illustrating a card 201 according to the second embodiment.

FIG. 4A is a view of the card 201 as viewed from upward.

FIG. 4B is a cross-sectional view of the card 201 (a cross-sectional view taken along line B-B in FIG. 4A).

The card 201 is formed by laminating a Lippmann hologram layer 260 and a transparent layer 270 on a transparent layer 50 of a card according to the first embodiment from the lower side Z1 to the upper side Z2.

The Lippmann hologram layer 260 is a layer having a Lippmann type hologram image 261.

The Lippmann hologram layer 260 is excellent in expressing a stereoscopic sense or a sense of depth in up and down directions and in left and right directions.

The Lippmann hologram layer 260, which is extremely difficult to counterfeit since the materials used and the manufacturing process are special, can improve an antitampering effect and an anti-counterfeit effect as compared with, for example, an embossed hologram.

Contour dimensions of the Lippmann hologram layer 260 are smaller than those of the other layers. The Lippmann hologram layer 260 is arranged at a position overlapping a photographic image 41 of a laser color development layer 40.

The Lippmann hologram layer 260 has translucency.

The transparent layer 270 is a layer that protects the Lippmann hologram layer 260 and also has translucency.

Accordingly, in the area where the Lippmann hologram layer 260 is provided, the hologram image 261, the photographic image 41 of the laser color development layer 40, and a print information 21 of a symbol "ΔO□" of an offset print layer 20 are observed.

In the laser printing process of the card manufacturing process, the heat generated in the laser color development layer 40 transfers to the transparent layer 50 and then to the Lippmann hologram layer 260 (refer to an arrow B240c).

For this reason, the transparent layer 50 functions as a thermal insulator like a barrier layer 30, so that the damage to the Lippmann hologram layer 260 can be suppressed.

In addition, it was verified that the card 201 exhibits the effect of suppressing the damage to the Lippmann hologram layer 260 by an actually manufactured trial product.

Although the embodiments of the present invention have been described above, the present invention is not limited to the above-described embodiments, and various modifications and changes can be made, for example, as the modifications described later, which are within the technical scope of the present invention. In addition, the effects described in the embodiments merely have listed the most preferable effects obtained from the present invention, and the effects of the present invention are not limited to those described in the embodiments. In addition, the above-described embodiments and the modifications described later can be combined as appropriate, but detailed description thereof will be omitted.

(Modification)

(1) In the embodiment, the card in which the offset print layer is printed right above the base material has been illustrated as an example, but the present invention is not limited thereto. It may be sufficient that the offset print layer is provided between the base material and the barrier layer. For example, a transparent sheet having an offset print layer may be laminated between the base material and the barrier layer in the card.

(2) In the embodiment, the example in which the barrier layer is a colorless and transparent layer has been illustrated, but the present invention is not limited thereto. The barrier layer may include, for example, an optical diffraction structure having translucency (for example, a transparent emboss hologram or the like). In this case, the forgery suppression effect of cards can be improved.

(3) In the embodiment, the example in which the laminated body is a card has been illustrated, but the present invention is not limited thereto. The laminated body may be used, for example, for passports, boarding passes of transportation, and the like.

EXPLANATION OF REFERENCE NUMERALS

1, 201 card
10 base material
20 offset print layer
21, 22 print information
30 barrier layer
40 laser color development layer
50 transparent layer

The invention claimed is:

1. A method of producing a laminated body comprising:
laminating a print layer, a barrier layer, and a laser color development layer, in this order from one side of a base material
irradiating the laser color development layer to develop color with a laser beam;
wherein the print layer contains print content before irradiating and the print layer does not change upon irradiating;
wherein the print content is a figure, a pattern, or a monochromatic print with black or a color print with a plurality of colors;
wherein the laser color development layer is initially colorless and transparent before irradiating, and
wherein the barrier layer suppresses damage to the print layer due to heat generated in irradiating the laser color development layer to develop color with a laser beam.

2. The method according to claim 1 further comprising, laminating a translucent protective layer above the laser color development layer, protecting the laser color development layer.

3. The method according to claim 1 further comprising, laminating a transparent protective layer above the laser color development layer.

4. The method according to claim 3 further comprising, laminating a hologram layer above the transparent layer.

5. The method according to claim 1,
wherein a thickness t of the barrier layer is 0.01 mm t 0.05 mm.

6. The method according to claim 1,
wherein a thickness t of the barrier layer is 0.01 mm t 0.02 mm.

7. The method according to claim 1,
wherein the barrier layer has an optical diffraction structure.

8. The method according to claim 1,
wherein the laminated body is a card.

9. A method of producing a laminated body comprising:
laminating a print layer, a barrier layer, a laser color development layer, a transparent protective layer, and a hologram layer, in this order from one side of a base material
irradiating the laser color development layer to develop color with a laser beam;
wherein the print layer contains print content before irradiating and the print layer does not change upon irradiating;
wherein the print content is a figure, a pattern, or a monochromatic print with black or a color print with a plurality of colors;
wherein the laser color development layer is initially colorless and transparent before irradiating, and
wherein the barrier layer suppresses damage to the print layer due to heat generated in irradiating the laser color development layer to develop color with a laser beam.

10. The method according to claim 9,
wherein a thickness t of the barrier layer is 0.01 mm t 0.05 mm.

11. The method according to claim 9,
wherein a thickness t of the barrier layer is 0.01 mm t 0.02 mm.

12. The method according to claim 9,
wherein the barrier layer has an optical diffraction structure.

13. The method according to claim 9,
wherein the laminated body is a card.

14. A method of producing a laminated body comprising:
forming a print layer by offset printing or silk printing on a base material,
laminating a barrier layer and a laser color development layer, in this order from the print layer,
irradiating the laser color development layer to develop color with a laser beam;
wherein the print layer contains print content before irradiating and the print layer does not change upon irradiating;
wherein the print content is a figure, a pattern, or a monochromatic print with black or a color print with a plurality of colors;
wherein the laser color development layer is initially colorless and transparent before irradiating, and
wherein the barrier layer suppresses damage to the print layer due to heat generated in irradiating the laser color development layer to develop color with a laser beam.

15. The method according to claim 14 further comprising, laminating a transparent protective layer above the laser color development layer.

16. The method according to claim 14 further comprising, laminating a hologram layer above the transparent layer.

17. The method according to claim 14,
wherein the barrier layer has an optical diffraction structure.

* * * * *